United States Patent [19]
Lineberry

[11] Patent Number: 4,787,336
[45] Date of Patent: Nov. 29, 1988

[54] CONTROLLED ENVIRONMENT HABITAT FOR AQUARIUMS

[76] Inventor: W. Scott Lineberry, 109 Nut Bush Rd. W., Greensboro, N.C. 27410

[21] Appl. No.: 120,109
[22] Filed: Nov. 13, 1987
[51] Int. Cl.⁴ ............................................. A01K 63/00
[52] U.S. Cl. ........................................................ 119/5
[58] Field of Search ........................................ 119/3, 5

[56] References Cited
U.S. PATENT DOCUMENTS
4,026,243  5/1977  Jessop .................................... 119/5
4,117,805 10/1978  Ward ..................................... 119/5

Primary Examiner—Robert Peshock
Attorney, Agent, or Firm—Rhodes, Coats & Bennett

[57] ABSTRACT

A transparent housing having top, bottom and side walls contains plant or animal life in a habitat which is submerged in an aquarium. A forced air pump is connected by a tubular conduit to the housing for introduction of air into the housing. Perforations in one wall provide means for passage of air out of the housing and, when air pressure is reduced, permits water to flow into the habitat to provide nourishment to the life contained therein.

5 Claims, 6 Drawing Sheets

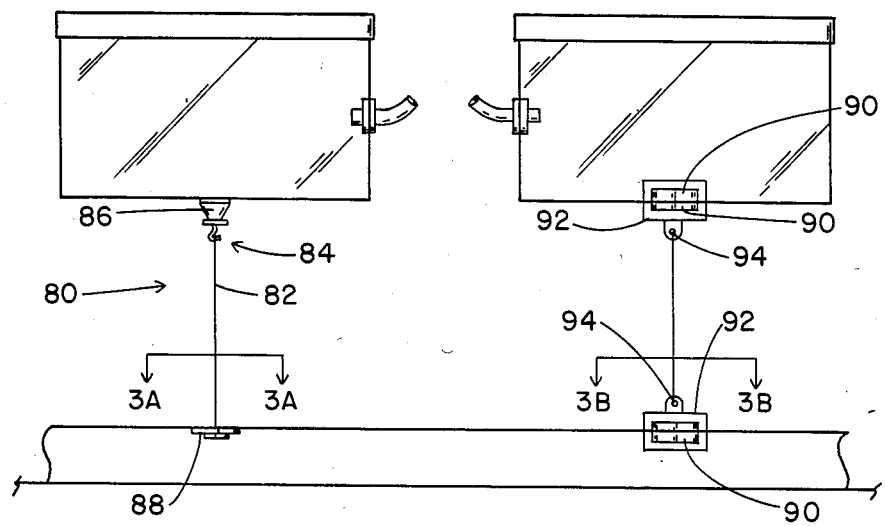
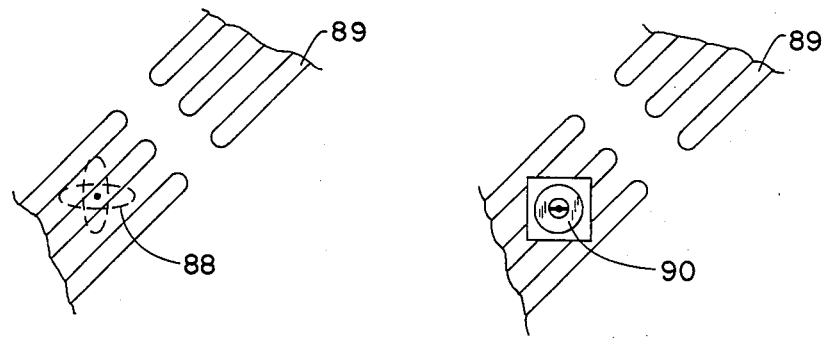
FIG. 3
FIG. 3A
FIG. 3B

CONTROLLED ENVIRONMENT HABITAT FOR AQUARIUMS

BACKGROUND AND SUMMARY OF THE PRESENT INVENTION

Aquariums have long been considered educational and entertaining and during recent years have become increasingly popular for the hobbyist. As with any trend, the increasing popularity brings new and useful improvements in equipment for practicing the hobby. With aquariums most of the new equipment has, of course, been related to the containers, pumps, filters, etc. and only a few innovative, decorative accessories have appeared on the market.

One of the more interesting approaches has been the development of closed receptacles for creating secondary environments submerged within the aquarium. Two such receptacles are described in U. S. Pat. Nos. 3,283,743 and 4,204,499. U.S. Pat. No. 3,283,743 discloses an environmental control chamber used for studying the behavior of ants, and the chamber is completely submerged in liquid. U.S. Pat. No. 4,204,499 is a newt sanctuary comprised of a submerged air bubble structure wherein aquarium bottom material extends up into the bubble, above the air-water interface, for supporting the newt.

A terrarium/aquarium is disclosed in U.S. Pat. No. 4,351,270 wherein a pyramidal-shaped terrarium is surrounded by a plurality of water-containing chambers for housing fish and aquatic plants. The two environments, however, are distinct.

The present invention is directed to an environmentally controlled habitat for containing and nurturing plants, insects, or small animals submerged within an aquarium. Unlike any of the known prior art, the present invention is a habitat environment which not only is submerged in an aquarium but also interacts with the aquatic environment to nurture the life contained within the habitat. In a preferred embodiment the present habitat is generally comprised of a transparent container having a removable top portion, an air conduit means for introducing atmospheric air into the submerged habitat, and a means for selectively introducing water from the aquarium into the habitat to water plants or increase humidity in the environment. Light is provided to the habitat by the lighting associated with the aquarium. The habitat is held submerged by a variety of types of hooks and/or suction cups as will be described hereinbelow.

The habitat has proved to be compatible with growth of a variety of species of non-aquatic plants, and some, including African violets, have produced blooms. The present invention is conducive to creation of an ecological system wherein a variety of interrelated environments can be established and studied by the hobbyist, and on a larger scale by the scientific community. The objectives of providing a controlled environment habitat submerged within an aquarium has been achieved; as has the provision of a submerged habitat which interacts with the surrounding aquatic environment. Other and further objectives and advantages will become apparent as the following detailed description is studied in conjunction with the accompanying drawings.

In the drawings:

FIGS. 3, 3A and 3B are diagrams which illustrate the means for submerging the habitats;

DETAILED DESCRIPTION OF A PREFERRED EMBODIMENT

Figure 1:
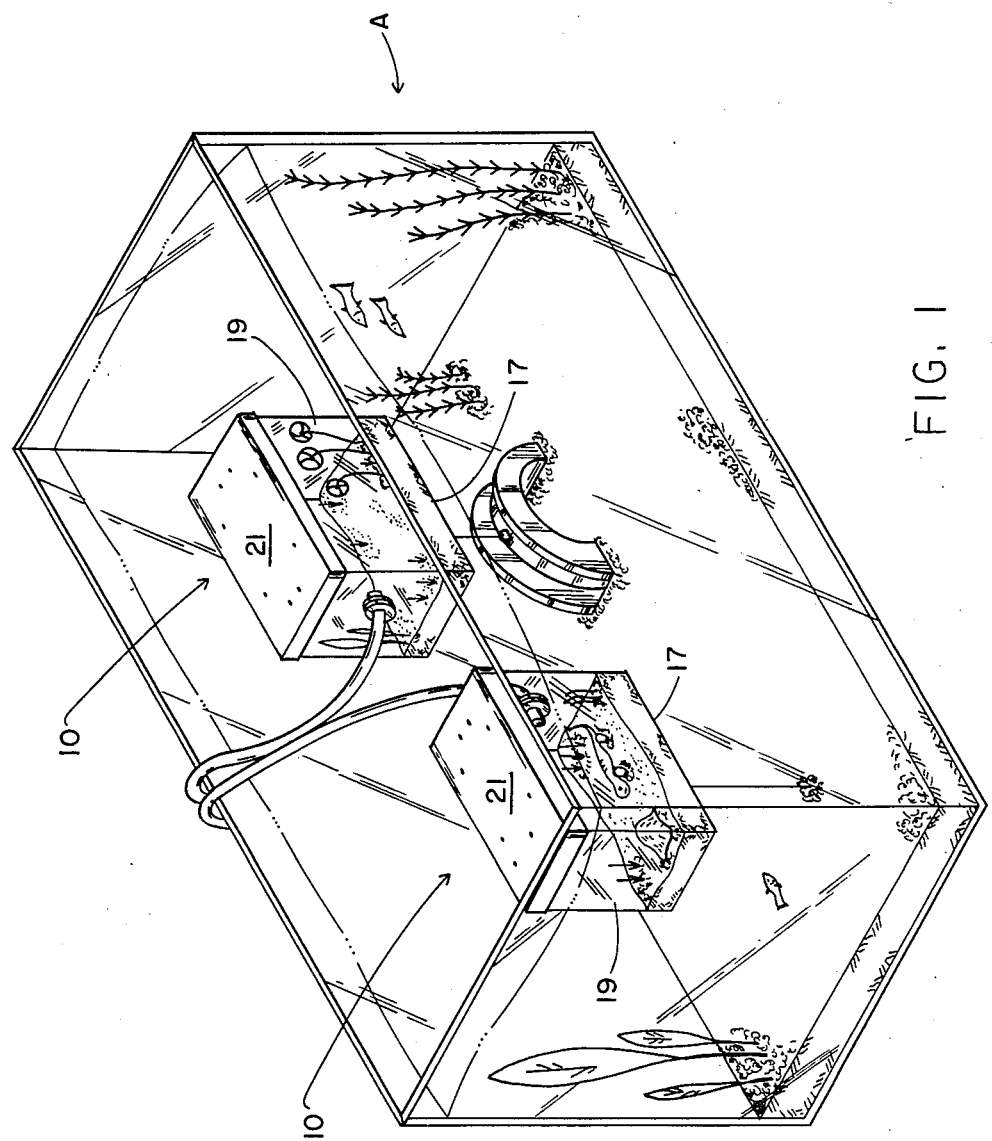
FIG. 1 is a perspective view of an aquarium with habitats submerged therein.
Figure 2:
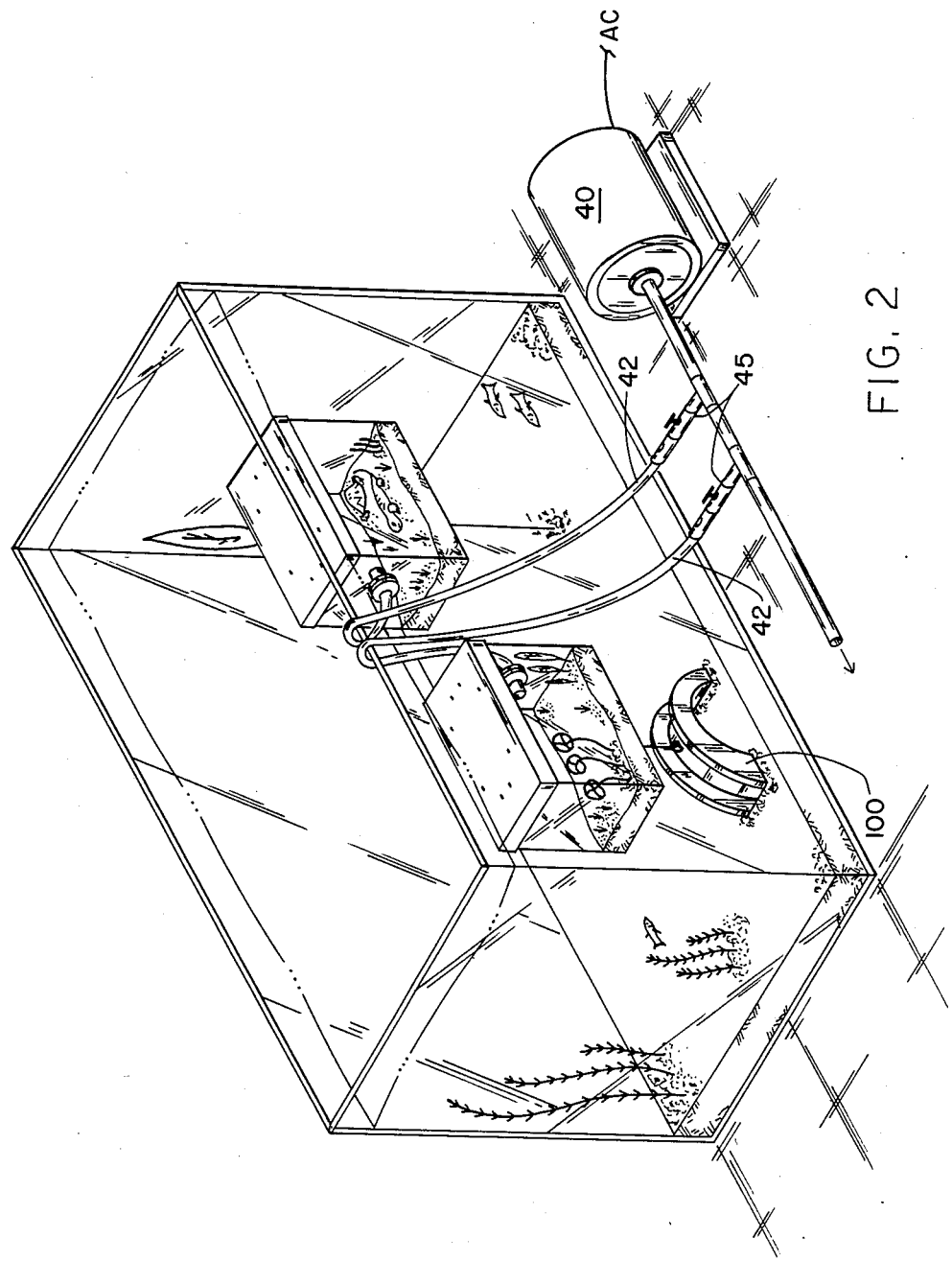
FIG. 2 is a perspective view taken from the rear of FIG. 1.
Figure 4:
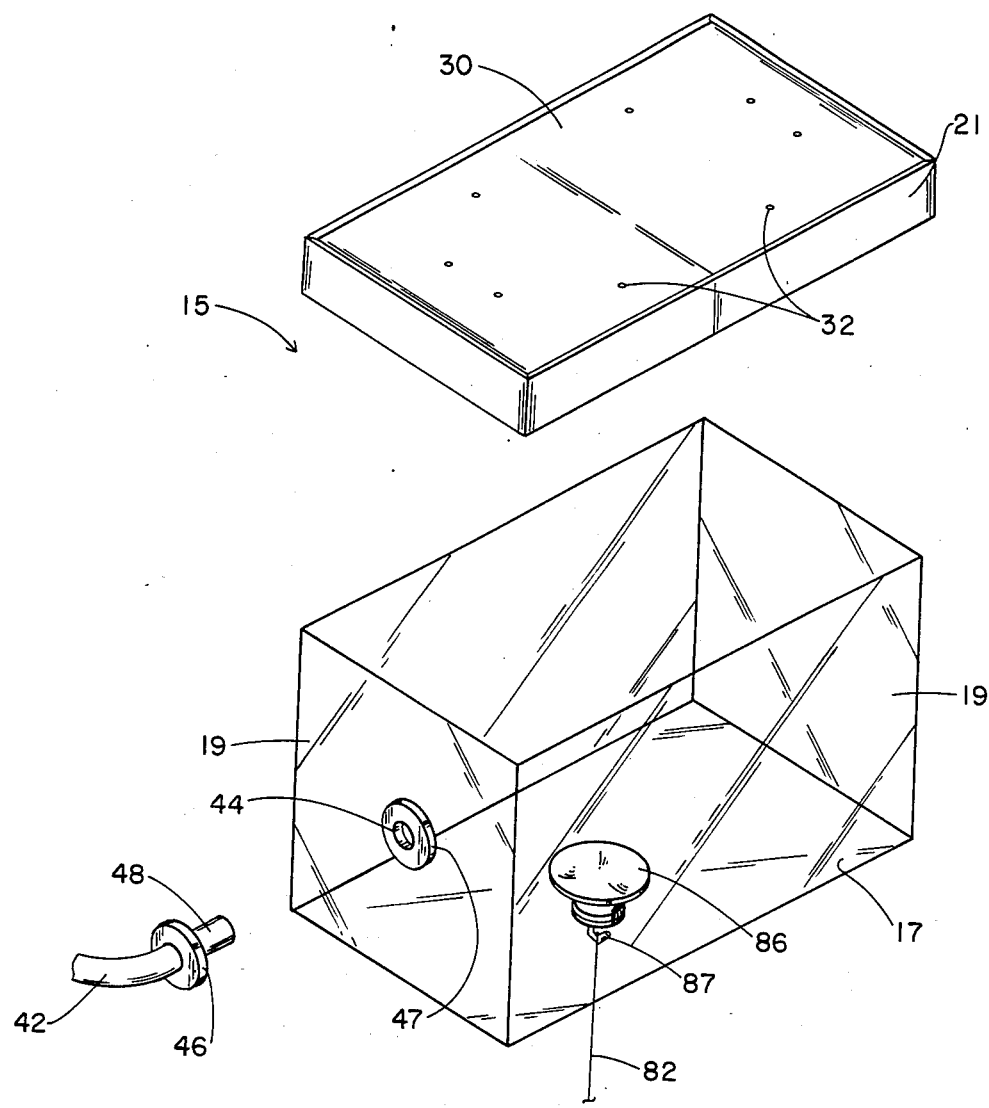
FIG. 4 is a perspective of the habitat according to a preferred embodiment.

Looking first at FIGS. 1 and 2, of the present invention, the habitat 10 is illustrated as would be submerged in an aquarium A, of a conventional type. The habitat 10 is generally comprised of a housing 15 having a bottom wall 17, sidewalls 19, and a removable top 21. In the illustrated embodiment the housing 15 is a rectangular shape, but there is no limitation to such shape and it is anticipated that the housings might be square, spherical, or any other desired shape.

The preferred material for construction is a transparent plastic material such as clear plexiglas which is durable and preferably rigid. The material must be capable of being cut or molded to shape and must withstand the pressure of the surrounding water. Further, any wall joints must have water tight seals and the removable top 21 must fit tightly enough to prevent leakage of water into the habitat.

Removable top 21 is basically of two types, one which is rigid and a flexible cap which has a soft membrane in the center thereof. Overall, the flexible membrane is probably the preferred capping for the habitat because it allows for some expansion against air pressure; and the membrane will also expand tightly against the edges of the cap and improve the sealing capabilities. However, as the size of the habitat increases, the flexible membrane becomes a liability because the increased surface area of the membrane makes air pressure build-up adjustments difficult.

Each type of caps or tops 21 include perforated areas 30 comprised of a plurality of perforations 32 in a random pattern which serve a twofold purpose. The first function of the perforations 32 is for passage of air out of the habitat as will be explained below. The second function is for selective introduction of water into the habitat as is also explained more in detail below.

Air is supplied to the habitat 10 by means of a pump 40, via an air conduit 42 which connects the pump to the habitat. Pump 40 is a conventional air pump of the type used with aquariums. If proper fittings are available, the pump which is being used to aerate the aquarium can also be used to supply air to the habitat. Conduit 42 is a length of flexible plastic tubing, approximately one-quarter to five-eighths diameter—the size being determined by the size of the habitat and the air flow requirements therefor.

Conduit 42 is inserted into a selected sidewall—of the habitat housing by means of an aperture 44 which is cut through the sidewall, corresponding in size to the external diameter of the conduit tubing 42. O-rings 46, 47 surround the tubing 42 immediately adjacent aperture 44 to seal the connection and prevent leakage of air from around the connection. The conduit 42 may be extended for some length beyond the sidewall connection into the habitat such that the air flow outlet end 48 of the tubing is flush with the inner surface of the sidewall of the habitat. The exact positioning of the air outlet 48 in the habitat is a matter of design choice. In some embodiments the tubing might be extended well into the habitat, but concealed by plants. In others, positioning the tubing outlet end 48 flush with the wall may be esthetically more pleasing. The objective of either embodiment is obviously the provision of atmospheric air to the environment within the habitat. So long as the air flow within the habitat is adequate to supply the environment and pressure build-up is controlled, the positioning of outlet 48 is not critical.

Air flows into the habitat from the conduit, and out through the aforementioned perforated area 30. The overall shape of the perforated areas 30 and the number, size, and positioning of the individual perforations 32 is determined by the preferred end use of the habitat. The habitats generally utilize perforations which are spaced apart along the outside edges of the cap 21 because pressure buildup and stress is greater at the edges of the cap, and because the primary function is for passage of air therethrough, rather than watering plants, etc. Placement of perforations 32 is one in middle, and two on each outer edge of the cap. These are the stress areas and the weakest connecting points of the top to the housing. If pressure is released at these points it prevents the top from blowing off. If a particular plant needs additional water, a supplementary hole is placed in the cap over the plant. The size of perforation is small, but will allow a rather steady flow of water into habitat.

With regard to the use of perforations 32 as a source of water for plants and the habitat environment generally, air flow through the habitat is supplied at all times under normal conditions, and because of the air flow through the habitat and exiting via perforations 32 is under pressure greater than the pressure of the surrounding water, flow of water from the aquarium through the perforations into the habitat is prevented. Therefore, when it is desired that plants be provided with water, or generally to humidify the habitat environment, air flow to the habitat is closed off, and water allowed to flow through the perforations into the habitat. By use of an escape valve or other air regulator, the amount of water flow can be controlled. When sufficient water has been supplied, full air flow is restored and the flow of water ceases.

Figure 6:
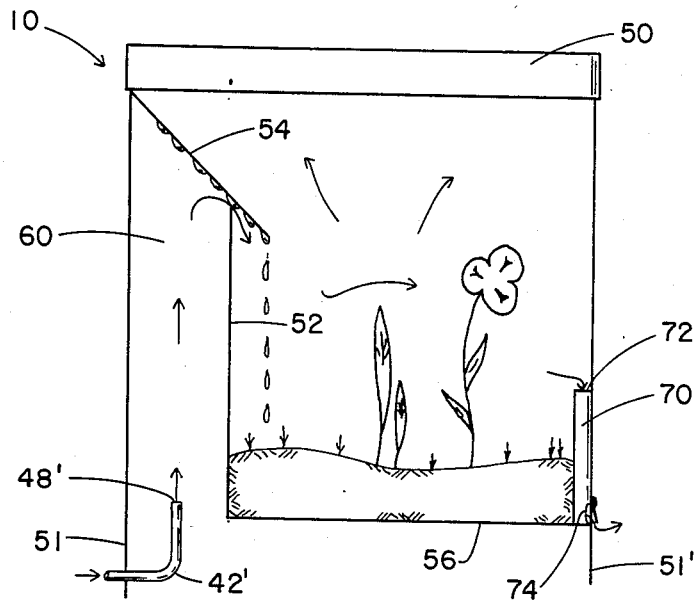
FIG. 6 is a side elevation of a habitat according to an alternate embodiment for use in salt water/marine aquariums.

Such an arrangement works well for watering plants when the habitats are submerged in a fresh water aquarium. However, for salt water/marine aquariums, the structure must be modified to supply water to the habitat from another source. The illustration in FIG. 6 details the structural arrangement wherein habitat 10 includes vertically extended sidewalls 51, 51', a removable non-perforate top 50, an inner vertical partition 52, and an evaporation plate 54, and a partial bottom wall 56. Sidewall 51, partition 52 and evaporation plate 54 in combination define an evaporation chamber 60 for distilling water by the process of evaporation for purposes of watering plants or humidifying the habitat. The air flow conduit 42' is connected to the sidewall 51 at a point below the partial bottom wall 56 and below the water level. The conduit outlet 48' is positioned approximately on the same plane as that of the partial bottom wall 56 to ensure that air flow is directed up into the evaporation chamber 60. As the air moves through the salt water, the air picks up moisture and deposits the moisture on evaporation plate 54 as the moist air strikes the plate. Moisture which condenses on the plate 54 flows down the side of the plate (which terminates at a point inside partition 52) and is deposited in the habitat. The evaporation process eliminates a substantial amount of salt from the water so that water deposited in the habitat is substantially distilled.

Air flow through the salt water moves into the evaporation chamber 60, through the opening over partition 52 and out of the habitat by means of an air evacuation tube 70 which has an inlet end 72 and an outlet end 74 which extends through the lower portion of sidewall 51'. The air flow pressure through this substantially open habitat must at all times be greater than the water pressure. If otherwise, the habitat will flood immediately. A stop valve 75 associated with outlet 74 prevents escape of air through tube 70 when it is desired, and to prevent flooding during maintenance.

FIGS. 3–3B all illustrate anchoring means for keeping the habitats submerged beneath water level in the aquarium. In FIG. 3 the anchoring means 80 is comprised of a tether line 82 with a hook or clip means 84 on either end. A first hook means 84 includes a suction cup 86 attached thereto, for attachment to the undersurface of bottom wall 17 of the habitat. A second hook means 88 is attached underneath and to the conventional undergravel filter grid 89 which is in the bottom of the aquarium. The tether 82 is preferably made of clear monofilament fishing line so that it is substantially unseen in the aquarium water. The filament tether 82 may obviously be of any desired length to retain the habitat in the preferred submerged position in the aquarium.

FIG. 3B illustrates an alternative tethering arrangement wherein plastic enclosed magnets are attached to each end of the tether line 82, and also within the habitat and underneath the filter grid 89. The magnets 90 to which the tether line is attached are small disc-shaped magnets which are encapsulated in a plastic casing 92 formed of a type of plastic which is appropriate for placement in an aquarium without harmful effect on the environment. Further, the plastic casing should be of minimal thickness and weight so as not to interfere with the magnetic effect. The casing 92 includes an eyelet 94 one surface for attachment to the tether line. As illustrated, the tethered magnets 90 are positioned opposite plastic encased magnets 90 which are within the habitat and underneath the filter grid. The magnetic force of each must be sufficient to penetrate the surrounding plastic casing, the floor of the habitat, and the undergravel filter grid.

Another alternative is tethering the habitat to an ornament or decorative figurine 100 placed in a desired position in the aquarium. The habitat may be connected thereto by the suction cup 86 and hook 87 or magnets 90, 94.

Other approaches to maintaining the habitat in a submerged position include the use of weights attached exteriorly of the habitat; ballast arrangements wherein a "payload" container (the habitat) is attached to a weighted "ballast" container; use of weighted ornamental objects surrounding the habitat on the floor of the aquarium; and a variety of other modifications. A retaining member having a suction cup on opposite ends thereof is used for attaching a habitat to a wall of the aquarium. The selection of the appropriate tethering means is not only a matter of esthetics, but also of maintaining the desired environment. For example, it has been mentioned above that the primary light source for the habitat is the fluorescent light on the aquarium.

Some additional light energy can be obtained from room surroundings if the sides of the aquarium are not concealed within aquarium plants.

Supplying food and other supplements to the habitat can be simple or complex, depending upon the requirements of the environment within the habitat. If plants are the primary environment of the habitat, the initial potting soil or growth medium will be sufficient since moisture remains contained within the habitat. If, however, insect or small reptiles are enclosed, the feeding becomes more complex. For insects, plants would be contained in the habitat and the insects feed on the plants. For those insects which do not feed on plants, other foods must be introduced. One approach is to remove the habitat from the aquarium, open the top and drop in food. An alternative approach is to leave the habitat submerged and, by means of the primary or a supplementary air flow line, introduce food by blowing the food in with the air supply. The preferred means to this approach would be to utilize a liquid or liquefied food supply and a special valve-controlled conduit interfaced with the air supply conduit.

Figure 5:
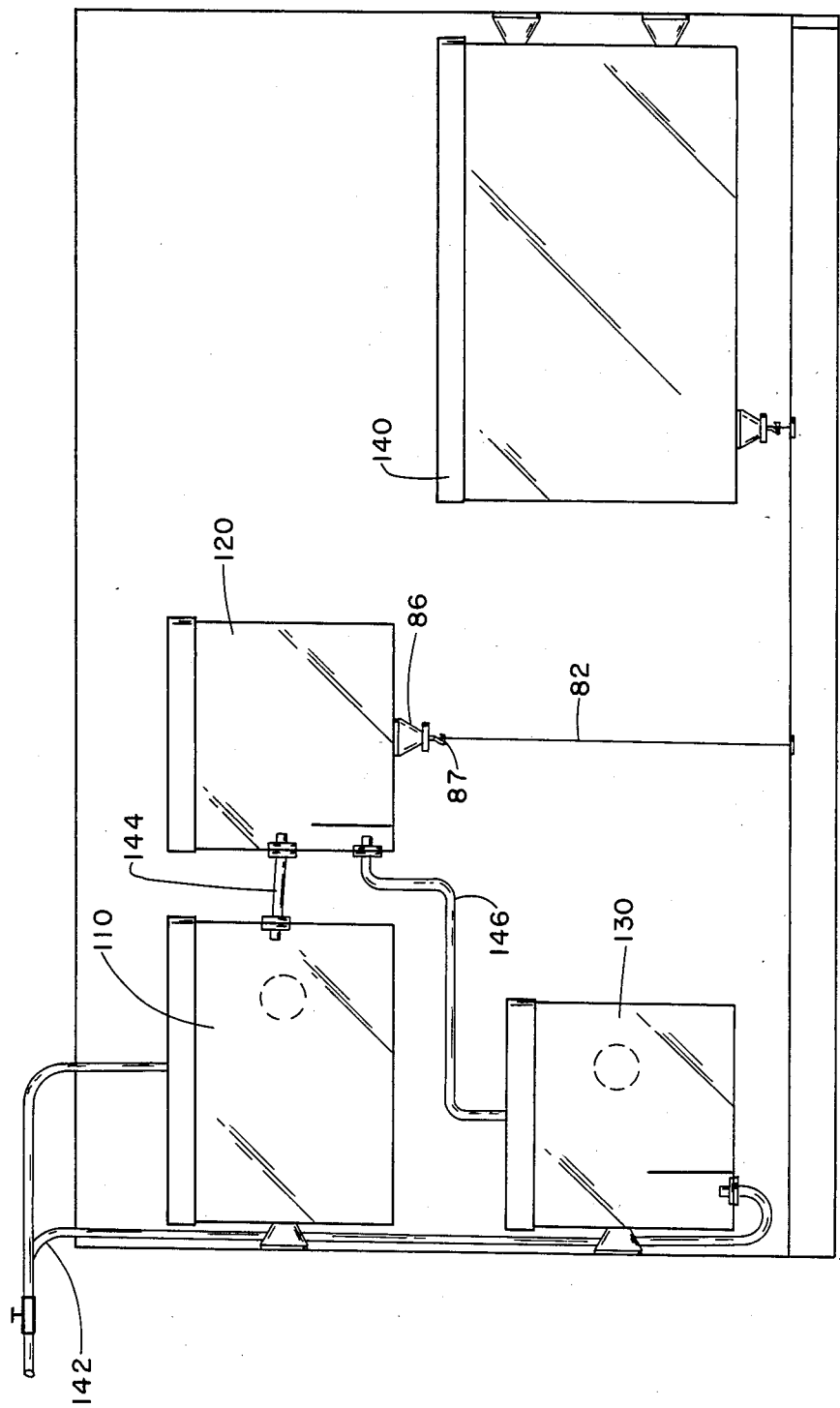
FIG. 5 is a schematic view of an interrelated ecosystem according to an alternate embodiment.

FIG. 5 illustrates a multihabitat ecosystem wherein multiple habitats utilize an interrelated or interconnected air supply. As shown, habitats 110, 120, and 130 are interconnected by air conduits 142, 144, and 146. Air is supplied by a pump as previously described to primary delivery conduit 142, into habitat 110. Connecting conduit 144 acts as an exit tube for air from habitat 110, and a delivery tube to habitat 120. Connecting conduit 146 delivers air from habitat 120 to habitat 130. The top wall or covers of each habitat include the aforedescribed perforated areas 30 for additional egress of air from the interconnected habitats. Without the perforations, air pressure backs up in the connected habitats and can cause one or more tops to blow off, flooding the habitats. Habitat 140 is not interconnected to the other three, but could be if desired. Feeding and watering of the interconnected habitats is as previously described for individual units.

Figure 7:
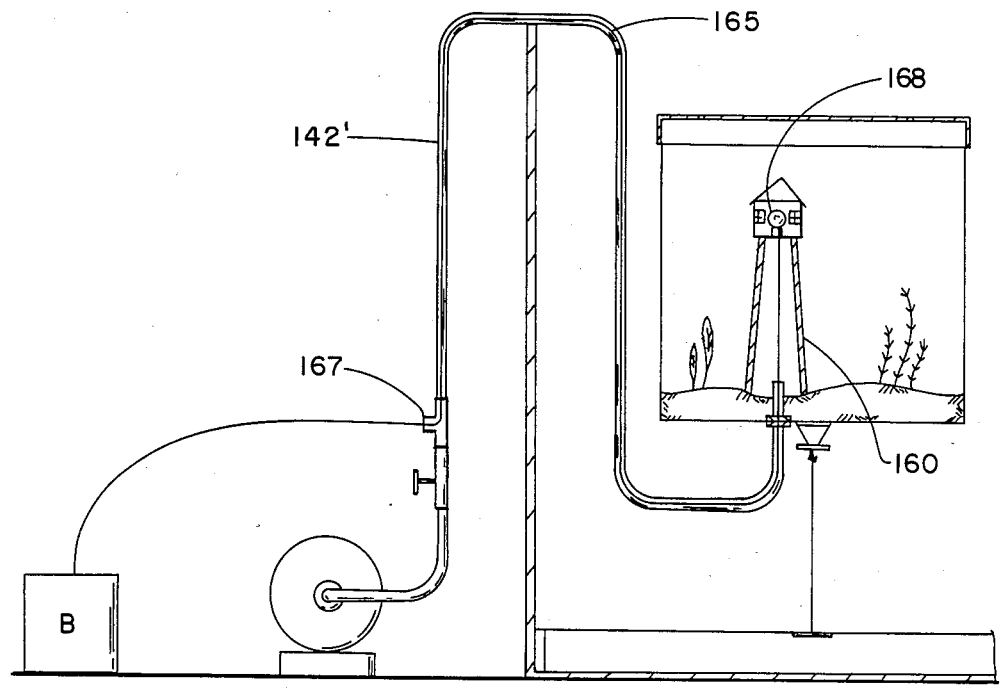

An additional component is shown in FIG. 7 where a lighted ornament, lighthouse 160, is included in habitat 130. The electrical connectors 165 are enclosed in the air delivery conduit 142' which is connected to the pump P and a battery power pack B by means of a sealed T-connector 167. The light bulb 168 is positioned in the miniature lighthouse at the air outlet end of the conduit. The electrical wiring is conventional, water proof wire having a plastic coating thereon. All connecting points are wrapped with electrical tape to seal against moisture.

While preferred embodiments have been described and illustrated, they are not meant as limitations. It is anticipated that other and further modifications will become apparent, and will fall within the scope of the claims below.

What is claimed is:

1. A controlled environment habitat for use submerged in an aquarium; said habitat including:
   (a) a transparent housing having top, bottom and side walls and being adapted to be received within and submerged below water in an aquarium;
   (b) said housing walls being impervious to air and water;
   (c) means for introducing air into said housing to support growth and life processes of the plants or animals contained in said habitat;
   (d) means associated with one of said walls for passage of air from the interior to the exterior of said housing and selective passage of water into the habitat;
   (e) means for retaining said housing in a submerged position in the aquarium;

whereby plants or small animals may be nurtured and maintained in a controlled environment within said aquarium.

2. A habitat according to claim 1 wherein said housing further includes said top wall being removable to provide access to the environment contained therein; said removable top wall further including means for retaining said top wall in a closed position to seal said housing when submerged in the aquarium.

3. A habitat according to claim 1 wherein said means for introducing air into said housing comprises:
   (a) a forced air pump;
   (b) a conduit connecting said pump to said housing for passageway of atmospheric air into said housing;
   (c) connecting means for connecting said conduit to a selected wall of said housing;
   (d) means for sealing said connecting means against leakage of air from said conduit into said aquarium.

4. A habitat according to claim 2 wherein said removable top wall includes a flexible membrane therein for permitting expansion to accommodate air flow in said housing.

5. A habitat according to claim 1 wherein said means for passage of air from the interior of said housing comprises a perforated area having a plurality of perforations formed in a selected wall of said housing to permit flow of air therethrough and out of said housing.

* * * * *